No. 12,331. REISSUED MAR. 28, 1905.
P. H. DEIS.
PUMP.
APPLICATION FILED NOV. 12, 1904.
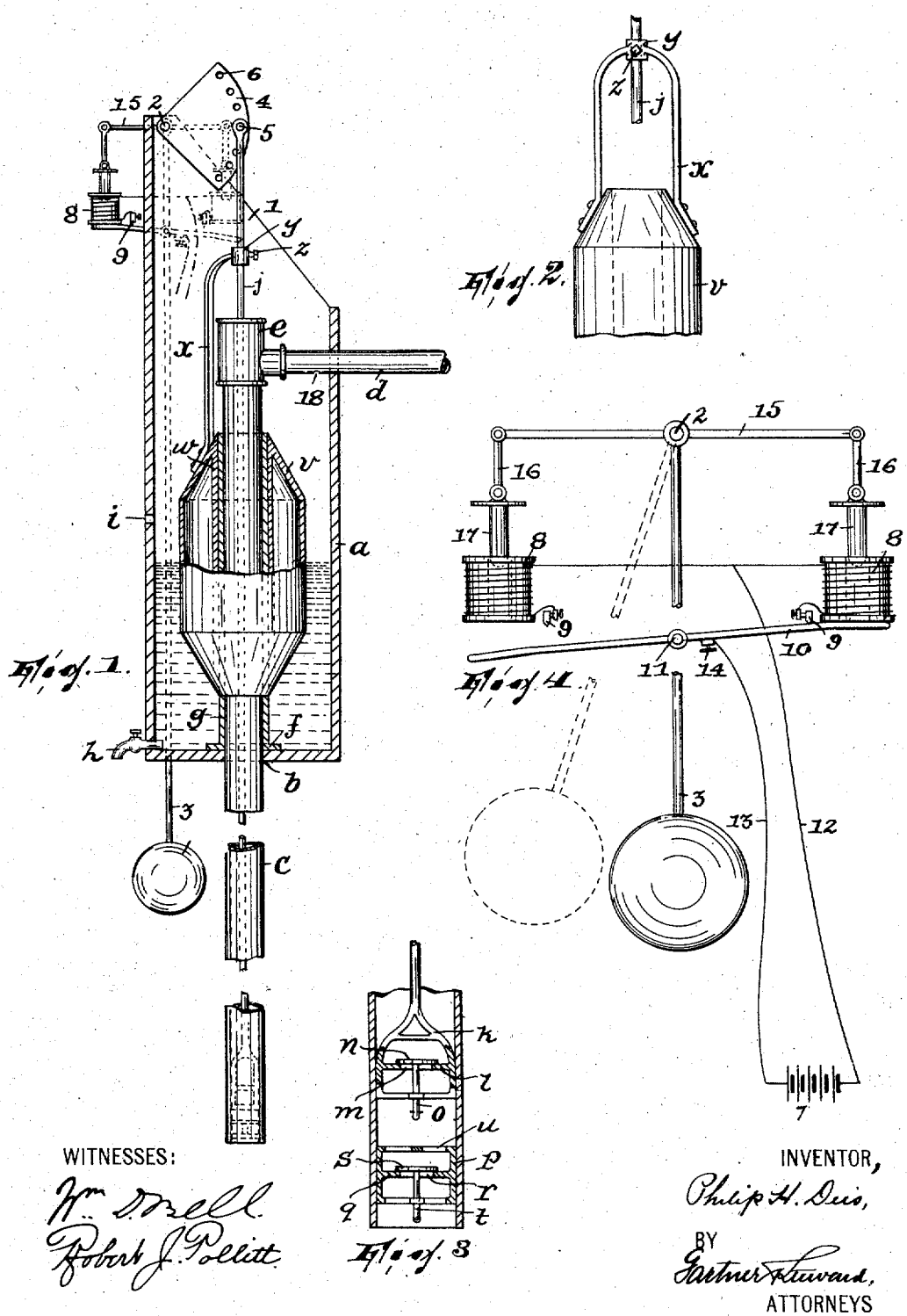
WITNESSES:
Wm. D. Mell.
Robert J. Pollitt.
INVENTOR,
Philip H. Deis,
BY
Gartner & Howard,
ATTORNEYS
PHOTO-LITHOGRAPHED BY SACHETT & WILHELMS LITHO. & PTG. CO. NEW YORK.

No. 12,331. Reissued March 28, 1905.

UNITED STATES PATENT OFFICE.

PHILIP H. DEIS, OF WASHINGTON, DISTRICT OF COLUMBIA, ASSIGNOR, BY DIRECT AND MESNE ASSIGNMENTS, TO DEIS PUMP COMPANY, A CORPORATION OF THE DISTRICT OF COLUMBIA.

PUMP.

SPECIFICATION forming part of Reissued Letters Patent No. 12,331, dated March 28, 1905.

Original No. 705,047, dated July 22, 1902. Application for reissue filed November 12, 1904. Serial No. 232,549.

*To all whom it may concern:*

Be it known that I, PHILIP H. DEIS, a citizen of the United States, residing in Washington, District of Columbia, have invented certain new and useful Improvements in Pumps, of which the following is a specification.

This invention relates to pumps; and it has reference particularly to pumps provided with means for automatically operating them so as to make them available for farm, irrigating, cattle-watering, and other similar purposes where considerable water is required to be drawn. The common form of pump of this nature is the wind-operated pump—*i. e.*, a pump having some form of wind-motor attached; but such pumps are more or less complicated in construction, liable to get out of order, difficult and inconvenient to repair and keep lubricated, since the nature of their motors necessitates their being placed at considerable height out of ready access, and objectionable from various other considerations as imperfectly accomplishing what they are intended to accomplish. Other forms of automatically-operated pumps have been devised and used; but if more reliable than wind-pumps they are not so capable of being so economically kept running, with the result that comparatively few are used.

In view of the foregoing the object of this my present invention is to provide a pump having automatic operating means which is simple, durable, and inexpensive in construction, regular and reliable in action, conveniently and readily kept in condition, and not liable to get out of order.

A further object of my invention is to provide a novel means wherefrom a periodical accumulation of energy is derived, such means resulting in a saving of power for operating the pump, whether the means for keeping the pump in motion is automatic or not.

My invention will be found fully illustrated in the accompanying drawings, wherein corresponding characters of reference indicate like parts, and wherein—

Figure 1 is a side view of my improved pump, a certain main chamber or receptacle portion thereof and certain other parts being shown in section. Fig. 2 is a front view of the upper portion of a certain float used as a portion of my apparatus. Fig. 3 is an enlarged detail view, in vertical section, of the main pipe through which the water is elevated, the piston or sucker, and the valve; and Fig. 4 is a view taken from the farther side of the pump as seen in Fig. 1 and showing in slightly-enlarged form the electromagnetic portion of the pump-motor.

In said drawings, *a* is a tank or other receptacle of preferably cylindrical form, which is adapted to receive a fluid, preferably water, which is adapted to act as one element of the motor. This tank or receptacle is open at the top and closed at the bottom except for the opening *b*, through which the main pipe *c* extends. Through the pipe *c* the water is adapted to be elevated to be discharged from the pump through its pipe *d*, which is connected with the upper end of the pipe *c* by an elbow *e*.

In the bottom of the tank or receptacle *a* is secured the lower flanged end *f* of a sleeve *g*. This sleeve extends up somewhat above the level which the water contained in said tank or receptacle is adapted to maintain, and being securely fitted to the bottom of the tank or receptacle about the opening *b* it prevents the water flowing out from the chamber by way of the said opening.

*h* is simply a cock located in the bottom of the tank or receptacle and adapted for draining the same.

*i* is an overflow-duct for the tank or receptacle, the same being disposed at the extreme upper level to which the water in the tank is intended to attain.

*j* is the sucker rod or spear, the same being formed with a guiding-stirrup *k* at its lower end, having a disk-like portion *l*, which is provided with an opening *m* and on which is adapted to seat over said opening a disk-valve *n*, whose stem *o* is guided in the lower portion of the stirrup. The upper portion of the stirrup forms a stop for the valve *n*. In the pipe *c* with said spear and the piston or sucker which it carries (and which piston or sucker comprises the parts last above referred to) and below said piston or sucker is arranged a cylinder *p*, having a diaphragm *q*, whose opening *r* is controlled by a valve *s*, adapted to seat on the top of said diaphragm and whose stem *t* is guided in a portion of said cylinder. The cross-piece *u*, forming another portion of said cylinder, acts as a stop for the valve *s*.

The sleeve *g* serves as a guide for a tightly-sealed buoyant chamber or float *v*, which in cross-section is substantially annular in form, its inner wall *w* fitting snugly about the sleeve *g*, though not so tightly but that the float moves freely in a vertical direction. It is preferable that the upper and lower ends of this float be tapered, as shown in Fig. 1, so that the minimum resistance will be offered to it when it is moved vertically in the body of water maintained in the tank *a*. This float carries a bracket *x* of arch-shaped form, which is preferably riveted thereto, said bracket having a head *y*, through which the upper end of the sucker rod or spear *j* projects, being there adjustably secured by a set-screw *z*.

In view of the foregoing description it will be seen that upon depressing the sucker-rod, thereby causing its sucker or piston to take above it in an obvious manner the water which is to be lifted, the body of water in the chamber *a* will tend to displace the float *v* and in doing so raise said float, the float in turn acting, through the bracket *x*, to elevate the sucker-rod and the water which its piston has taken up. It will be apparent that at any stage in the descent of the parts the flotative action of the float would cause the latter to assume a position where it would find its load—*i. e.*, the body of water in the pipe *c* which stands above the level of the water in the well—and enter into a condition of balance therewith if the parts were left to themselves, so that in result there is a storing up of energy to assist the prime actuation in overcoming inertia at the beginning of the succeeding upstroke, it being assumed, of course, that the weight of the volume displaced by the float is at least as great as the loaded pump-piston at the respective lowest limits of movement of the float and piston. Upon an upstroke the float will be lifted somewhat above its normal position in the sustaining medium. It will thus be seen that during both an upstroke and a downstroke there is an accumulation of energy which may be utilized in overcoming inertia at the beginning of a succeeding stroke.

In order to keep the pump in action automatically, I employ the following mechanism: The tank or receptacle is formed with an extension 1, constituting a support for an arbor or rock-shaft 2, to which is rigidly secured the upper end of a pendulum 3 and a segment 4. The segment practically forms a crank on the rock-shaft, and to it is connected the upper end of the spear *j* by means of a pivotal pin 5. The segment is provided with an arc-shaped series of holes 6, any one of which may receive the pivoting-pin 5, so as to thus make possible an adjustment between the spear and the pendulum. Once the pendulum is started swinging the float and the pendulum will coact to keep the pump operating for a considerable length of time, the one reinforcing and balancing the action of the other, so that the operation is kept regular and easy.

7 is a source of electrical energy, such as a battery, forming a part of an electrical circuit which includes, besides said battery, interconnected electromagnetic coils or solenoids 8, contact-points 9, which are connected to the ends of said coils, a circuit maker and breaker consisting of a lever 10, pivoted at 11 near its center and having its ends opposed to the coils and the contact-points, an electrical conductor 12, connecting the battery with the conductor which joins the coils, and another conductor 13, connecting the battery with the circuit maker and breaker, as as 14.

On the arbor 2 is secured a rocking beam 15, to the ends of which are pivotally connected links 16, carrying the armatures 17 for the coils 8. The coils and the circuit maker and breaker may have any suitable supporting means.

In view of what was above stated in regard to the operation of the pump in so far as the combined action of the pendulum and the float are concerned it is only necessary to now explain the additional effect produced by the action of the electromagnetic mechanism when the pump is in action. It being assumed that the pendulum is swinging toward the dotted line position thereof illustrated in Fig. 4 and that the lever 10 is engaging the right-hand contact-point 9, a complete electrical circuit will be established through the battery, conductor 12, the right-hand solenoid 8, the right-hand contact-point 9, the lever 10, and the conductor 13. The effect will be to energize the solenoid, which will act to attract the lever and hold it in contact therewith. At the same time, the circuit being thus established, the solenoid will draw its armature into it, thus giving an impulse to the pendulum 3 through the parts connecting it with said armature, which will carry it farther than its momentum would carry it. When the armature approaches its limit of movement in the solenoid, it depresses the adjoining end of lever 12, and consequently raises its other end, thus breaking the circuit made through the right-hand solenoid, contact-point, and right-hand portion of the lever and establishing it through the left-hand solenoid, contact-point, and left-hand end of the lever. The result will be that the right-hand armature will be released, permitting the pendulum to swing to the right, its momentum being augmented by the left-hand armature, which is drawn into its solenoid, the latter being now energized by the making of the circuit in which it is included. In this manner the action of the pump may be kept up so long as the electrical energy is maintained at the source 7 and the pump left working for a practically indefinite length of time without any attention whatsoever.

I wish it to be understood that I am not limited to the use of electromagnetic means for imparting impulses to the pendulum, so as to keep up its action, for their are various other means which may be used for effecting this, also that it is not essential that the impulses be imparted to the pendulum at every vibration thereof, for it is conceivable that means be provided whereby impulses may be periodically imparted to the pendulum without reference to their frequency, or even that any contrivance be used to keep the pendulum of the pump in motion, for it will be found that the coaction of the float and the pendulum so facilitates the action of the pump as to render the latter well adapted to be worked manually. However, when it is necessary to keep the pump in motion a considerable length of time it appears that the impulse-imparting mechanism for the pendulum which I have herein shown and described is not only thoroughly efficient, but probably more inexpensive to maintain and certainly as reliable in its action as any.

In practice it will be found that the water in tank *a* will in time evaporate. This may be compensated for by providing the pipe *d* with a small orifice 18, adapted to permit water to leak from said pipe, and thus keep the water in tank *a* up to the proper level. In order, furthermore, to prevent the water in the tank *a* from freezing, said tank may be inclosed in any material, such as a packing of charcoal, to insulate the water-space in said chamber from the outside air.

Having thus fully described my invention, what I claim as new, and desire to secure by Letters Patent, is—

1. In a pump, the combination, with the main conducting-pipe for the liquid to be elevated and with reciprocating liquid-elevating means in said pipe, of a fluid-containing receptacle, a buoyant body normally sustained elevated by the fluid in said receptacle and connected with the liquid-elevating means for movement therewith, a pendulum, and operative connecting means between the pendulum and the liquid-elevating means, substantially as described.

2. In a pump, the combination, with the main conducting-pipe for the liquid to be elevated and with reciprocating liquid-elevating means in said pipe, of a fluid-containing receptacle, a buoyant body normally sustained elevated by the fluid in said receptacle, and a pendulum, said pendulum, said liquid-elevating means and the buoyant body being operatively connected together, substantially as described.

3. In a pump, the combination, with the main conducting-pipe for the liquid to be elevated and with reciprocating liquid-elevating means in said pipe, of a fluid-containing receptacle penetrated vertically by said pipe, a buoyant body surrounding said pipe and normally sustained elevated by the fluid in said receptacle, and a pendulum, said pendulum, the liquid-elevating means and the buoyant body being operatively connected together, substantially as described.

4. In a pump, the combination, with the main conducting-pipe for the liquid to be elevated and with reciprocating liquid-elevating means in said pipe, of a fluid-containing receptacle having an opening in its bottom wall, said pipe extending vertically through said opening, a guiding-sleeve secured to the bottom of said receptacle about the opening and receiving said pipe, an annular float surrounding said sleeve and normally sustained elevated by the fluid in said receptacle, and a pendulum, said pendulum, the liquid-elevating means and the float being operatively connected together, substantially as described.

5. In a pump, the combination, with the main conducting-pipe for the liquid to be elevated and with reciprocating liquid-elevating means in said pipe, of a fluid-containing receptacle, a buoyant body normally sustained elevated by the fluid in said receptacle, a pendulum, said pendulum, said liquid-elevating means and the buoyant body being operatively connected together, and means for imparting periodic impulses to the pendulum, substantially as described.

6. In a pump, the combination, with the main conducting-pipe for the liquid to be elevated and with reciprocating liquid-elevating means in said pipe, of a fluid-containing receptacle, a buoyant body normally sustained elevated by the fluid in said receptacle, a pendulum, said pendulum, said liquid-elevating means and the buoyant body being operatively connected together, and electromagnetic means for imparting periodic impulses to the pendulum, substantially as described.

7. In a pump, the combination of the main conducting-pipe for the liquid to be elevated, liquid-elevating means in said pipe, a pendulum, operative connecting means between the pendulum and the liquid-elevating means, and electromagnetic means for imparting periodic impulses to the pendulum and comprising electrically interconnected electromagnets, contact-points arranged in duplicate and electrically connected each with a magnet, a battery, a pivoted circuit maker and breaker adapted to be actuated by either of said magnets at a time and to engage either of said contact-points at a time, conductors connecting the battery with the said circuit maker and breaker and the battery with the electromagnets, armatures adapted to be attracted by said magnets and to move said circuit maker and breaker out of engagement with the adjacent contact-points, and operative connecting means between the pendulum and said armatures, substantially as described.

8. The combination of the main conducting-pipe for the liquid to be elevated, a pump-piston, a fluid-containing receptacle, separate from the conducting-pipe, a buoyant body sustained by and partially submerged in the fluid in said receptacle and means for suspending said piston from the buoyant body, substantially as described.

In testimony whereof I have hereto set my hand this 7th day of November, 1904.

PHILIP H. DEIS.

Witnesses:
CHARLES S. FLETCHER,
E. LAUBINGER.